Sept. 11, 1934.　　　　E. C. GOEBERT　　　　1,972,886
SPRING SUSPENSION FOR VEHICLES
Filed Dec. 16, 1932　　　2 Sheets-Sheet 1

Inventor
Elmer C. Goebert
By W. N. Roach
Attorney

Sept. 11, 1934.  E. C. GOEBERT  1,972,886
SPRING SUSPENSION FOR VEHICLES
Filed Dec. 16, 1932   2 Sheets-Sheet 2
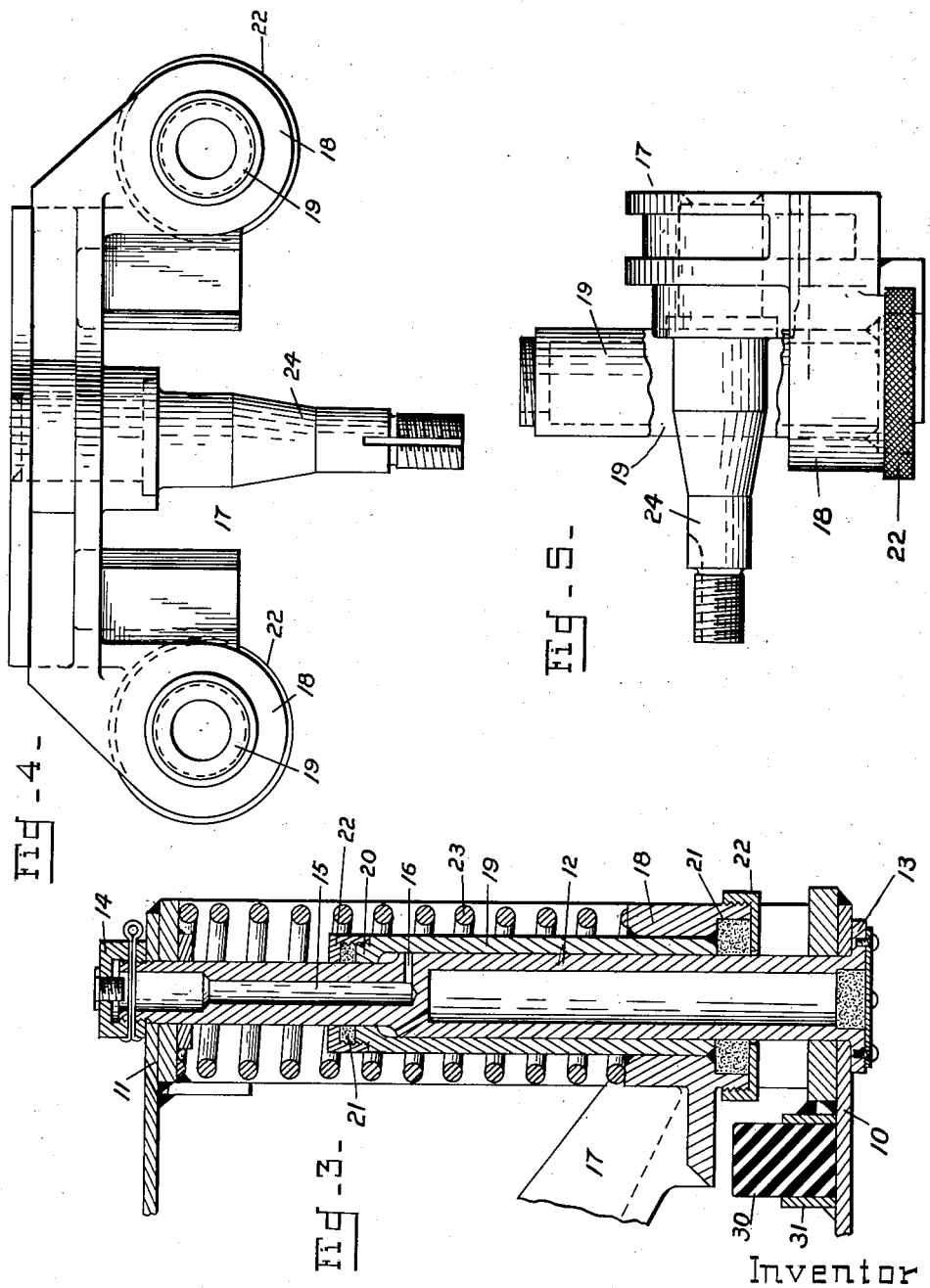
Inventor
Elmer C. Goebert
By W. N. Roach
Attorney Patented Sept. 11, 1934

1,972,886

UNITED STATES PATENT OFFICE 1,972,886

SPRING SUSPENSION FOR VEHICLES

Elmer C. Goebert, Philadelphia, Pa.

Application December 16, 1932, Serial No. 647,591

2 Claims. (Cl. 301—133)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a spring suspension for vehicles.

The purpose of the present invention is to arrange a spring suspension within the periphery of a wheel and to have it constitute part of the wheel unit so that it is conveniently removable therewith.

To these and other ends, the invention consists in the construction, arrangement and combination of elements described hereinafter and pointed out in the claims forming a part of this specification.

A practical embodiment of the invention is illustrated in the accompanying drawings, wherein:

Fig. 3 is an enlarged longitudinal sectional view of one element of the suspension.

Fig. 4 is a plan view of the yoke, and

Fig. 5 is a view in side elevation thereof.

Figure 1:
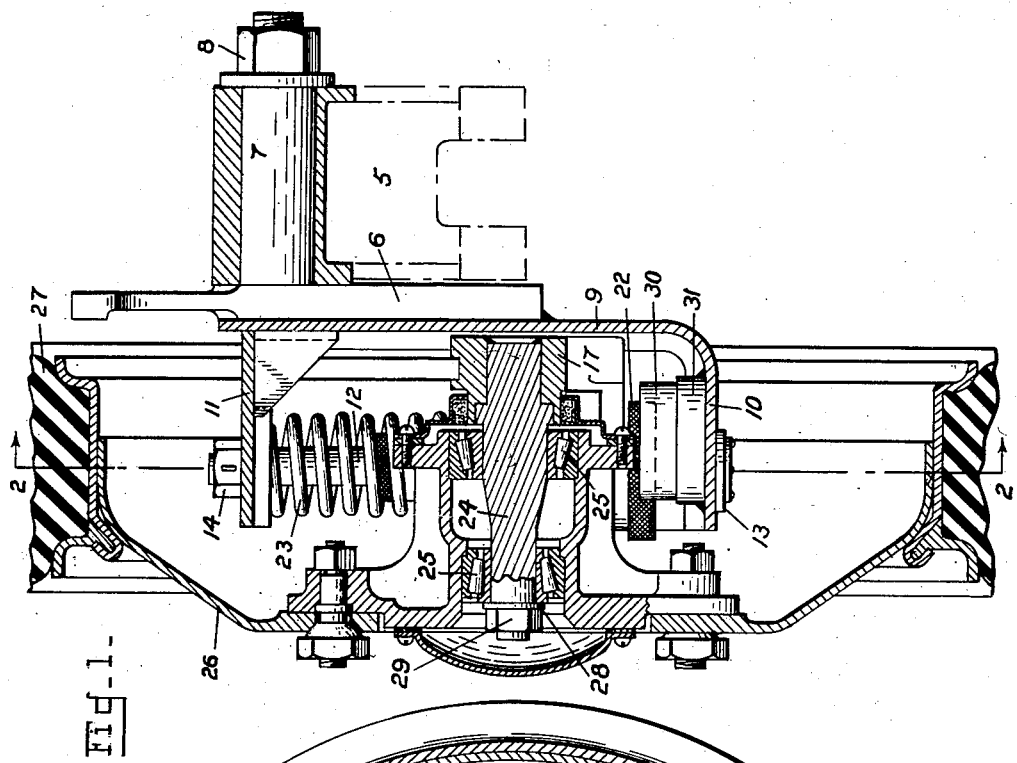
Fig. 1 is a longitudinal sectional view through a wheel equipped with the improved suspension.
Figure 2:
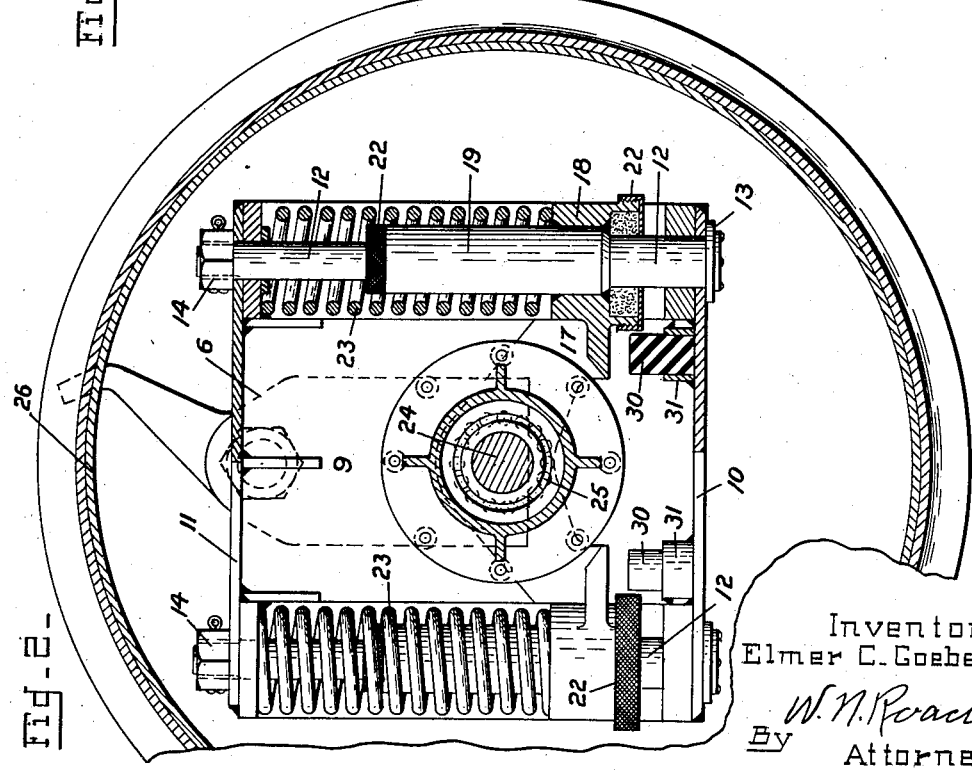
Fig. 2 is a view partly in side elevation and partly in section with the hub of the wheel removed.

The member 5 that is to be supported is a vehicle and in the present application of the invention it is a gun carriage. A crank arm 6 provided for each side of the carriage includes a spindle 7 journaled in the carriage 5 and retained by a nut 8.

The depending portion of the crank arm consists of a relatively wide back plate 9 having a horizontally disposed bottom plate 10 and top plate 11. The plates 10 and 11 are connected by a pair of spaced columns 12—12 that are securely held in place by means of a flange 13 on one end and a nut 14 on the other end respectively engaging the outer faces of the bottom and top plates. The upper portion of each column is reduced and provided with an axial lubricating passage 15 leading to a radial passage 16 opening in the outer face of the column.

A yoke 17 has a bearing 18 on each end embracing respective columns 12. In order to increase the effective surface of the bearing it preferably includes a long sleeve 19 slidably fitting the main portion of the column and having its upper end 20 turned in to engage the reduced portion of the column. A packing 21 at each end of the sleeve is retained by a threaded cap 22. A helical spring 23 embracing the sleeve 19 is seated on the bearing 18 and the top plate 11.

A laterally projecting spindle 24 fixed centrally to the yoke carries anti-friction bearing units 25—25 on which a wheel 26 is mounted. The center line of the tire 27 on the wheel is in the plane of the two springs 23. The outside bearing unit is retained by means of a washer 28 and a nut 29 threaded on the end of the spindle.

Blocks 30 of resilient material, such as rubber, are confined in sockets 31 on the bottom plate 10 in position to be engaged by the yoke 17.

In operation the spring suspension functions in the accepted manner when the wheel encounters irregularities and the rebound is checked by the resilient blocks 30.

The present arrangement offers particular advantages for a gun carriage where the supported member 5 is lowered to the ground in order to provide a rigid firing platform and the wheels are rendered inoperative by removal or by swinging them on crank arms.

In breaking down a carriage to provide individual loads or transportation it is a great convenience to have the spring suspension carried by the wheels and disposed within the periphery thereof.

I claim:

1. In a suspension, a load member, an arm on said member including vertically spaced laterally projecting plates, a pair of spaced columns connecting the plates, the upper portion of each column being reduced and provided with an axial lubricating passage, a yoke positioned between the columns, a bearing sleeve on each end of the yoke and mounted on a column, said bearing sleeve having its upper end turned in to engage the reduced portion of the column, a packing on each end of each bearing sleeve, a helical spring embracing each sleeve and seated on the yoke and the upper laterally projecting plate, resilient blocks on the lower laterally projecting plate in position to engage the yoke, a spindle carried by the yoke between the bearing sleeves, and a wheel mounted on the spindle.

2. In a suspension, a load member, an arm on said member including vertically spaced laterally projecting plates, a pair of spaced columns connecting the plates, the upper portion of each column being reduced and provided with an axial lubricating passage, a yoke positioned between the columns, a bearing sleeve on each end of the yoke and mounted on a column, said bearing sleeve having its upper end turned in to engage the reduced portion of the column, a helical spring embracing each sleeve and seated on the yoke and the upper laterally projecting plate, a spindle carried by the yoke between the bearing sleeves, and a wheel mounted on the spindle.

ELMER C. GOEBERT.